US012809503B2

(12) United States Patent
Zhou et al.

(10) Patent No.: US 12,809,503 B2
(45) Date of Patent: Nov. 24, 2026

(54) SYSTEM AND METHOD FOR MULTI MODAL INPUT AND EDITING ON A HUMAN MACHINE INTERFACE

(71) Applicant: Robert Bosch GmbH, Stuttgart (DE)

(72) Inventors: Zhengyu Zhou, Fremont, CA (US); Jiajing Guo, Mountain View, CA (US); Nan Tian, Foster City, CA (US); Nicholas Feffer, Stanford, CA (US); William Ma, Lagrangeville, NY (US)

(73) Assignee: Robert Bosch GmbH (DE)

( * ) Notice: Subject to any disclaimer, the term of this patent is extended or adjusted under 35 U.S.C. 154(b) by 143 days.

(21) Appl. No.: 17/973,314

(22) Filed: Oct. 25, 2022

(65) Prior Publication Data

US 2024/0134505 A1 Apr. 25, 2024
US 2024/0231580 A9 Jul. 11, 2024

(51) Int. Cl.
*G06F 3/04842* (2022.01)
*G06F 3/01* (2006.01)
(Continued)

(52) U.S. Cl.
CPC .......... *G06F 3/04842* (2013.01); *G06F 3/013* (2013.01); *G06F 3/0481* (2013.01); *G06F 3/167* (2013.01); *G06F 40/166* (2020.01)

(58) Field of Classification Search
CPC .... G06F 3/04842; G06F 3/0481; G06F 3/013; G06F 3/167; G06F 40/166
See application file for complete search history.

(56) References Cited

U.S. PATENT DOCUMENTS

| | | | |
|---|---|---|---|
| 8,484,573 | B1 | 7/2013 | Zhai et al. |
| 10,275,023 | B2 | 4/2019 | McKenzie et al. |

(Continued)

FOREIGN PATENT DOCUMENTS

| | | |
|---|---|---|
| IN | 201941012248 | 10/2020 |

OTHER PUBLICATIONS

Website https://www.theverge.com/22197463/amazon-echo-frames-review-alexa Dieter Bohn, "Amazon Echo Frames review: listen to these specs Great in concept, but there's a limit to what Alexa can do on a phone." Dated Dec. 24, 2020, Retrieved Oct. 27, 2022, 12 Pages.

(Continued)

*Primary Examiner* — Nhat Huy T Nguyen
(74) *Attorney, Agent, or Firm* — Dickinson Wright PLLC

(57) ABSTRACT

A virtual reality apparatus that includes a display configured to output information related to a user interface of the virtual reality device, a microphone configured to receive one or more spoken word commands from a user upon activation of a voice recognition session, an eye gaze sensor configured to track eye movement of the user, and a processor programmed to, in response to a first input, output one or more words of a text field, in response to an eye gaze of the user exceeding a threshold time, emphasize a group of one or more words of the text field, toggle through a plurality of words of only the group utilizing the input interface, in response to a second input, highlight and edit an edited word from the group, and in response to utilizing contextual information associated with the group a language model, outputting one or more suggested words.

17 Claims, 8 Drawing Sheets

(51) Int. Cl.

| | |
|---|---|
| ***G06F 3/023*** | (2006.01) |
| ***G06F 3/0481*** | (2022.01) |
| ***G06F 3/16*** | (2006.01) |
| ***G06F 40/166*** | (2020.01) |

(56) References Cited

U.S. PATENT DOCUMENTS

| | | | | |
|---|---|---|---|---|
| 2006/0125659 | A1 | 6/2006 | Kim et al. | |
| 2008/0140307 | A1 | 6/2008 | Chen et al. | |
| 2008/0195940 | A1 * | 8/2008 | Gail | G06F 40/242 704/9 |
| 2009/0217196 | A1 * | 8/2009 | Neff | G06Q 10/10 715/799 |
| 2010/0171700 | A1 | 7/2010 | Sharan et al. | |
| 2012/0029910 | A1 | 2/2012 | Medlock et al. | |
| 2015/0364140 | A1 * | 12/2015 | Thörn | G06F 3/167 704/235 |
| 2016/0048223 | A1 | 2/2016 | Taguchi et al. | |
| 2017/0293402 | A1 | 10/2017 | Morris et al. | |
| 2019/0034405 | A1 * | 1/2019 | Ivan | G06F 40/211 |
| 2019/0362557 | A1 * | 11/2019 | Lacey | G06F 3/167 |
| 2020/0106726 | A1 | 4/2020 | Pham | |
| 2021/0074277 | A1 * | 3/2021 | Lewis | G06F 3/013 |
| 2023/0359818 | A1 * | 11/2023 | Sharifi | G06F 40/253 |

OTHER PUBLICATIONS

Jacob Devlin et al., "BERT: Pre-training of Deep Bidirectional Transformers for Language Understanding." Proceedings of NAACL-HLT 2019, pp. 4171-4186.

Lik Hang Lee et al., "Hibey: Hide the Keyboard in Augmented Reality." 2019 IEEE International Conference on Pervasive Computing and Communications (PerCom, Mar. 2019, 11 Pages.

Wenge Xu et al., "Pointing and Selection Methods for Text Entry in Augmented Reality Head-Mounted Displays." 2019 IEEE International Symposium on Mixed and Augmented Reality (ISMAR), pp. 279-288.

Xueshi Lu et al., "iText: Hands-free Text Entry on an Imaginary Keyboard for Augmented Reality Systems." The 34th Annual ACM Symposium on User Interface Software and Technology, Virtual Event, USA, Oct. 2021, pp. 815-825.

Jacqui Fashimpaur et al., "PinchType: Text Entry for Virtual and Augmented Reality Using Comfortable Thumb to Fingertip Pinches." CHI EA 2020: Extended Abstracts of the 2020 CHI Conference on Human Factors in Computing Systems Apr. 2020, pp. 1-7.

Dan Jurafsky et al., Speech and Language Processing Online book 2021, Chapter 3, N-gram Language Models., Retrieved Oct. 27, 2022, 29 Pages.

* cited by examiner

SYSTEM AND METHOD FOR MULTI MODAL INPUT AND EDITING ON A HUMAN MACHINE INTERFACE

TECHNICAL FIELD

The present disclosure relates to a human machine interface (HMI), including an HMI for an augmented reality (AR) or virtual reality (VR) environment

BACKGROUND

In virtual and/or augmented reality applications (e.g., those implemented on AR helmets or smart glasses), allowing users to input one or more sentences is a desirable function, which enables various levels of human-computer interaction, such as sending messages or virtual-assistant dialogs. Compared to the common messaging apps and voice assistants like Alexa, in augmented reality environments, multiple modalities including text, speech, eye gaze, gesture, and environmental semantics can potentially be applied jointly in sentence inputting, as well as in text editing (e.g., correcting/editing one or more words in a previously input sentence), in order to achieve the highest input efficiency. The optimal way to integrate the modalities may vary for different usage scenarios, thus one modality may not be efficient for one input task, but may be efficient for another input task.

For the task of text inputting, various modalities have been explored, such as key-touching with finger(s) on a virtual keyboard, finger-swiping on a virtual keyboard, eye-gaze based key selection with a virtual keyboard, and speech. However, for each of those previous systems, typically only one major modality may be involved as the input method, ignoring the various needs of users in different usage scenarios (e.g., the user may not be willing to speak out in public to type in text with private or confidential content). In addition, in previous virtual/augmented reality applications, the text-editing function to allow user to correct/change certain word(s) in the inputted text sentence is often very limited or even absent, although both virtual keyboard and speech based text inputting may generate errors in the inputting result.

SUMMARY

A first embodiment discloses, a virtual reality device that includes a display configured to output information related to a user interface of the virtual reality device, a microphone configured to receive one or more spoken word commands from a user upon activation of a voice recognition session, an eye gaze sensor including a camera, wherein the eye gaze sensor is configured to track eye movement of the user, and a processor in communication with the display and the microphone, wherein the processor is programmed to in response to a first input from an input interface of the user interface, output one or more words of a text field of the user interface, in response to an eye gaze of the user exceeding a threshold time, emphasizing a group of one or more words of the text field associated with the eye gaze, toggle through a plurality of words of only the group utilizing the input interface, in response to a second input from the user interface associated with the toggling, highlighting and editing an edited word from the group, and in response to utilizing contextual information associated with the group of one or more words and a language model, outputting one or more suggested words associated with the edited word from the group.

A second embodiment discloses a system including a user interface that includes a processor in communication with a display and an input interface including a plurality of modalities of input, the processor programmed to in response to a first input from the input interface, output one or more words of a text field of the user interface, in response to a selection exceeding a threshold time, emphasizing a group of one or more words of the text field associated with the selection, toggle through a plurality of words of the group utilizing the input interface, in response to a second input from the user interface associated with the toggling, highlighting and editing an edited word from the group, in response to utilizing contextual information associated with the group of one or more words and a language model, outputting one or more suggested words associated with the edited word from the group, and in response to a third input, selecting and outputting one of the one or more suggested words to replace the edited word.

A third embodiment discloses, a user interface that includes a text field section and a suggestion field section, wherein the suggestion field section is configured to display suggested words in response to contextual information associated with the user interface. The user interface is configured to, in response to a first input from an input interface, output one or more words of the text field of the user interface, in response to a selection exceeding a threshold time, emphasizing a group of one or more words of the text field associated with the selection, toggle through a plurality of words of the group utilizing the input interface, in response to a second input from the user interface associated with the toggling, highlighting and editing an edited word from the group, in response to utilizing contextual information associated with the group of one or more words and a language model, outputting one or more suggested words at the suggestion field section, wherein the one or more suggested words are associated with the edited word from the group, and in response to a third input, selecting and outputting one of the one or more suggested words to replace the edited word.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In this disclosure, the system may propose an advanced multi-modal virtual augmented-reality text-inputting solution, which may enable the user to: (1) select one inputting method involving a certain modality/modalities to input text sentence based on the user's usage scenario and (2) to conduct text editing (e.g., correct/change one or more words in the inputted sentence when necessary) with certain convenient modality/modalities. The modality sets involved for text-sentence inputting and text editing may be different, chosen by the user to maximize the system usability and text-input efficiency. For example, the user may choose to use speech to input the text sentence, but use a virtual keyboard to correct a mis-recognized name in one embodiment. In another case, the user may prefer to use a virtual keyboard to input a confidential text sentence, but may choose speech as the modality to edit some insensitive words in the inputted sentence.

In this disclosure, the system proposed may include a multi-modal text-inputting solution for virtual/augmented reality applications, such as a smart glasses. The solution may in general composed of three steps. A first step may include inputting a text sentence(s) by certain method, which involves one or more modalities. The inputted sentence(s) includes one or more erroneous words, or the user wants to change certain word(s). For each of those words to edit, the user may conduct a second step and select the word to edit by a certain method of input modality, which involves on or more modalities. In the third step, the user may edit the selected word by certain method, which involves one or more modalities.

Figure 1:
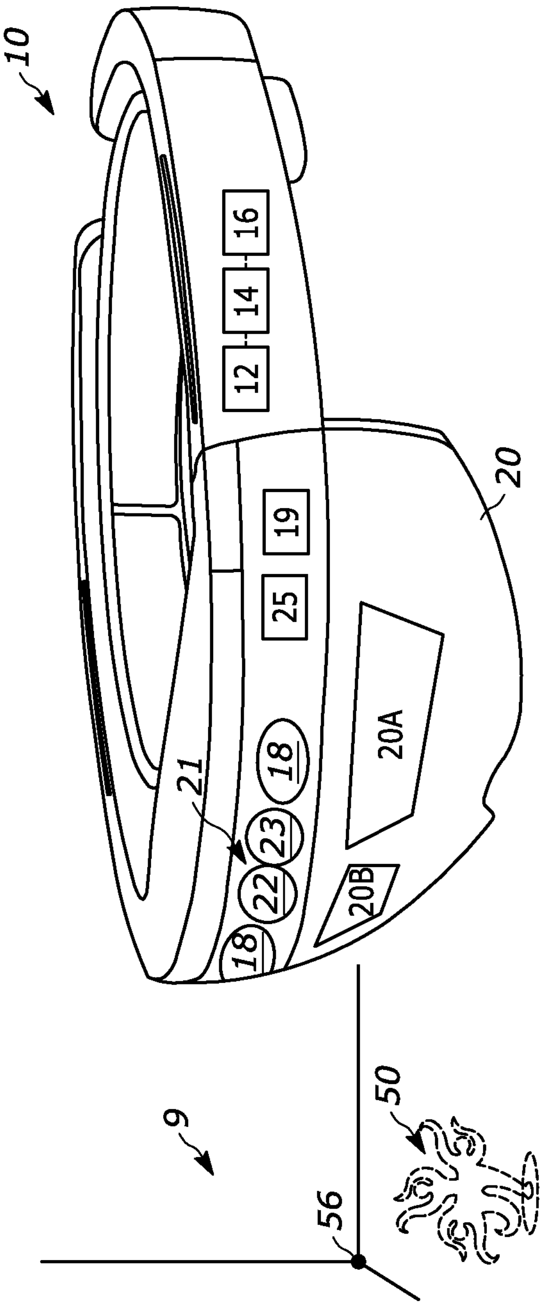
FIG. 1 shows a computing device in the form of a head-mounted display device, according to an example embodiment of the present disclosure.

FIG. 1 illustrates a computing device 10 in the form of a head mounted display device 10, according to one embodiment of the present disclosure, which has been conceived to address the issues discussed above. As shown, the computing device 10 includes processor 12, volatile storage device 14, non-volatile storage device 16, cameras 18, display 20, active depth camera 21. The processor 12 is configured to execute software programs stored in non-volatile storage device 16 using portions of volatile storage device 14 to perform the various functions recited herein. In one example, the processor 12, volatile storage device 14, and non-volatile storage device 16 may be included in a system-on-chip configuration included in the head mounted display device 10. It will be appreciated that the computing device 10 may also take the form of other types of mobile computing devices, such as, for example, a smartphone device, a tablet device, a laptop, a machine vision processing unit for an autonomous vehicle, robot, drone, or other types of autonomous devices, etc. In the systems described herein, devices in the form of computing device 10 may be utilized as a first display device and/or a second display device. Thus, the device may include a virtual reality device, augmented reality device, or any combination therefore. The device may include a virtual keyboard as well.

Display 20 is configured to be at least partially see-through, and includes right and left display regions 20A, 20B which are configured to display different images to each eye of the user. The display may be a virtual reality or augmented reality display. By controlling the images displayed on these right and left display regions 20A, 20B, a hologram 50 may be displayed in a manner so as to appear to the eyes of the user to be positioned at a distance from the user within the physical environment 9. As used herein, a hologram is an image formed by displaying left and right images on respective left and right near-eye displays that appears due to stereoscopic effects to be positioned at a distance from the user. Typically, holograms are anchored to the map of the physical environment by virtual anchors 56, which are placed within the map according to their coordinates. These anchors are world-locked, and the holograms are configured to be displayed in a location that is computed relative to the anchor. The anchors may be placed in any location, but are often placed in positions at locations where features exist that are recognizable via machine vision techniques. Typically, the holograms are positioned within a predetermined distance from the anchors, such as within 3 meters in one particular example.

In the configuration illustrated in FIG. 1, a plurality of cameras 18 are provided on the computing device 10 and are configured to capture images of the surrounding physical environment of the computing device 10. In one embodiment, four cameras 18 are provided, although the precise number of cameras 18 may vary. The raw images from the cameras 18 may be stitched together with perspective correction to form a 360 degree view of the physical environment, in some configurations. Typically, cameras 18 are visible light cameras. Images from two or more of the cameras 18 may be compared to provide an estimate of depth, using passive stereo depth estimation techniques.

In addition to visible light cameras 18, a depth camera 21 may be provided that uses an active non-visible light illuminator 23 and non-visible light sensor 22 to emit light in a phased or gated manner and estimate depth using time-of-flight techniques, or to emit light in structured patterns and estimate depth using structured light techniques.

Computing device 10 also typically includes a six degree of freedom inertial motion unit 19 that includes accelerometers, gyroscopes, and possibly magnometers configured to measure the position of the computing device in six degrees of freedom, namely x, y, z, pitch, roll and yaw.

Data captured by the visible light cameras 18, the depth camera 21, and the inertial motion unit 19 can be used to perform simultaneous location and mapping (SLAM) within the physical environment 9, to thereby produce a map of the physical environment including a mesh of reconstructed surfaces, and to locate the computing device 10 within the map of the physical environment 9. The location of the computing device 10 is computed in six degrees of freedom, which is important to displaying world-locked holograms 50 on the at least partially see through display 20. Without an accurate identification of the position and orientation of the computing device 10, holograms 50 that are displayed on the display 20 may appear to slightly move or vibrate relative to the physical environment, when they should remain in place, in a world-locked position. This data is also useful in relocating the computing device 10 when it is turned on, a process which involves ascertaining its position within the map of the physical environment, and loading in appropriate data from non-volatile memory to volatile memory to display holograms 50 located within the physical environment.

The IMU 19 measures the position and orientation of the computing device 10 in six degrees of freedom, and also measures the accelerations and rotational velocities. These values can be recorded as a pose graph to aid in tracking the display device 10. Accordingly, even when there are few visual cues to enable visual tracking, in poorly lighted areas or texture-less environments for example, accelerometers and gyroscopes can still enable spatial tracking by the display device 10 in the absence of visual tracking. Other components in the display device 10 may include and are not limited to speakers, microphones, gravity sensors, Wi-Fi sensors, temperature sensors, touch sensors, biometric sensors, other image sensors, eye-gaze detection systems, energy-storage components (e.g. battery), a communication facility, etc.

In one example, the system may utilize an eye sensor, a head orientation sensor or other types of sensors and systems to focus on visual pursuit, nystagmus, vergence, eyelid closure, or focused position of the eyes. The eye sensor may include a camera that can sense vertical and horizontal movement of at least one eye. There may be a head orientation sensors that senses pitch and yaw. The system may utilize a Fourier transform to generate a vertical gain signal and a horizontal gain signal.

The system may include a brain wave sensor for detecting the state of the user's brain wave and a heart rate sensor for sensing the heart rate of the user. The brain wave sensor may be embodied as a band so as to be in contact with a head part of a user, or may be included as a separate component in a headphone or other type of device. The heart rate sensor may be implemented as a band to be attached to the body of a user so as to check the heart rate of the user, or may be implemented as a conventional electrode attached to the chest. The brain wave sensor 400 and the heartbeat sensor 500 calculate the current brain wave state and the heart rate of the user so that the controller can determine the order of the brain wave induction and the speed of the reproduced audio according to the current brain wave state or heart rate of the user. And provides the information to the control unit 200.

The system may include an eye tracking system. The head mounted display device (HMD) may collect raw eye movement data from at least one camera. The system and method may utilize the data to determine the location of the occupant's eyes. The system and method may determine eye location to determine the line of sight of the occupant.

The system thus includes a multitude of modalities to utilize as an input interface connected to the system. The input interface may allow a user to control certain visual interfaces or graphical user interfaces. For example, the input interface may include buttons, controllers, joy sticks, mouse, or user movement. In one example, a head nod left may move a cursor left, or a head nod right may move a cursor right. The IMU 19 may be utilized to gauge the various movement.

Figure 2:
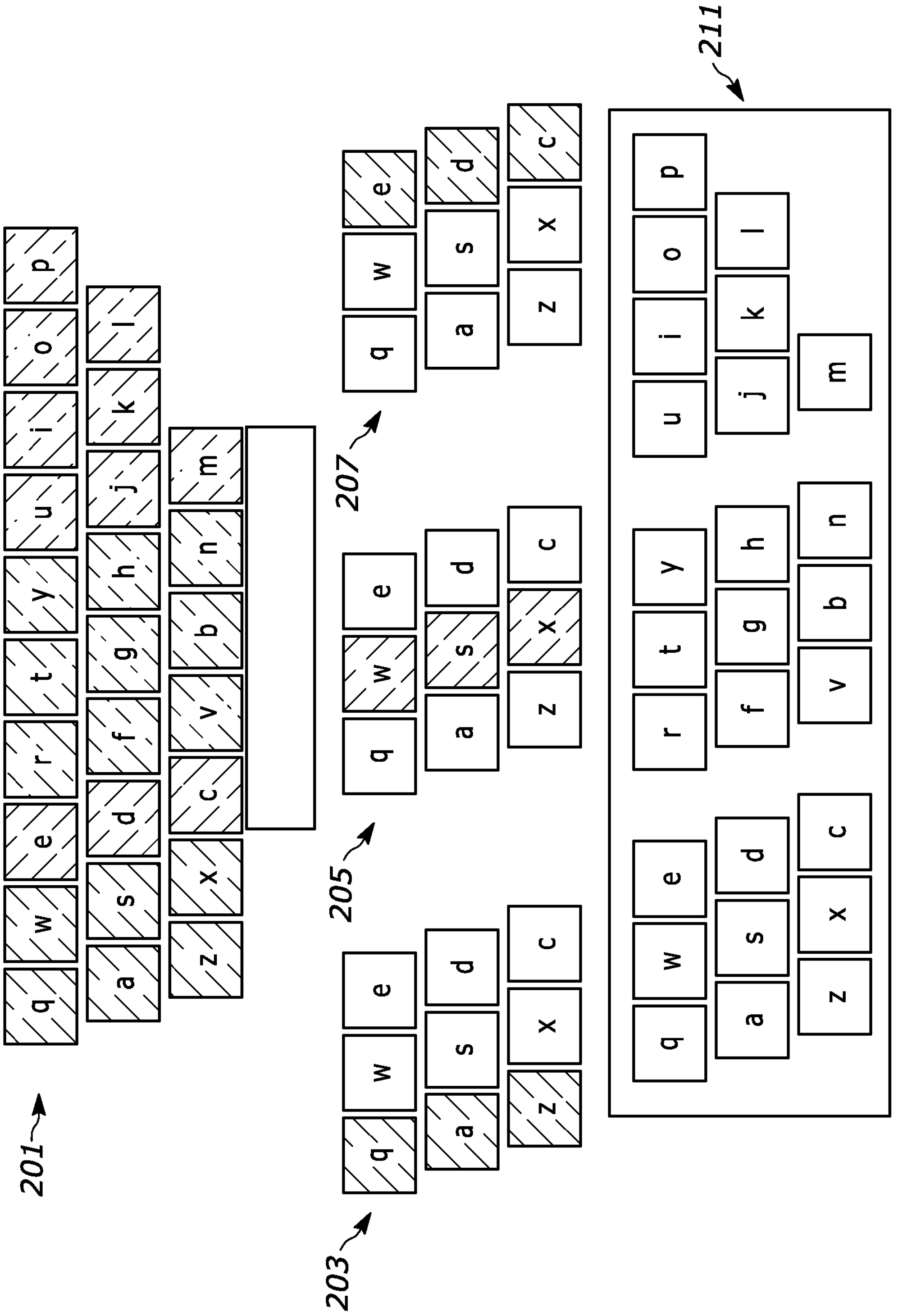
FIG. 2 illustrates an example keyboard layout of an interface.

FIG. 2 illustrates an example keyboard layout of an interface. As it shows in FIG. 2, the system may divide the QWERTY keyboard into 3 sections, left section 203; middle section 205; and a right section 207, which may be large areas for the user to interact with in coarse selections. The three coarse areas may be sub sequentially divided into additional three sections, such as a left-middle-right sub-sections. However, any group of characters and any subsection may be utilized. In one example, one such Coarse-n-Fine grouping for English is to have the coarse groups be collections of three fine groups from left to right across the keyboard ({qaz, wsx, edc} group 203, {rfv, tgb, yhn} group 205, {ujm, ik, olp} group 207), and to have each of the columns of the QWERTY keyboard be its own fine group, such as for example (qaz, wsx, edc, rfv, tgb, yhn, ujm, ik, olp). Thus, each group may include a subset of columns.

The user may enter a letter of a word by first selecting the coarse group and then the fine group the letter belongs to. For example, if a user wants to type "h," the coarse group is selected, the fine group is right. Thus, a user may make two selections for each letter input under an embodiment of the disclosure.

Because each fine group may be associated to a coarse group, selecting a coarse group narrows the selection space for the fine group. Thus, the fine group may be a subset associated with the coarse group subset. With the example grouping, selecting each fine group individually may require nine options (e.g., such as a T9 keyboard), whereas selecting a coarse and fine group requires six options: three for selecting the coarse group and three more for selecting the fine group within the selected coarse group in one embodiment. This is may be advantageous when the degrees of interaction are limited, such as when there is limited space on a physical controller. The spacing between the coarse sections and the size of the keyboard (distance from user) can also adjusted by the user to fit their preferences. Thus, layout 211 is an embodiment of an alternative keyboard layout.

Users can use a single device to perform the letter selection in one embodiment. In another embodiment, the user may also use multiple devices such as controllers, buttons, joysticks, and trackpad to make a selection.

Figure 3A:
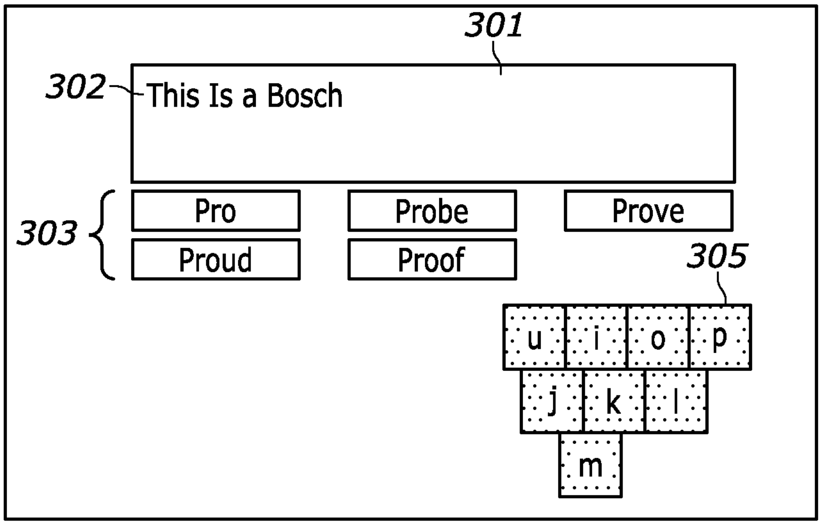
FIG. 3A illustrates a selection of a first subset with a coarse area selection.

FIG. 3A discloses a selection of a coarse area. For example, the user may gaze at the middle coarse area. The eye tracking on the HMD detects such a selection and then highlights the area 305. The eye tracking on HMD may detect such selection and highlighted the area. Highlighting may include changing a color, style, size (e.g., increasing size/decreasing size), italicizing, bolding, or any other item. While shading may be utilized to minimize the non-relevant portion of the keyboard, other styles may be utilized. These may include a change color, style, size (e.g., increasing size/decreasing size), shading, italicizing, bolding, or any other item.

Figure 3B:
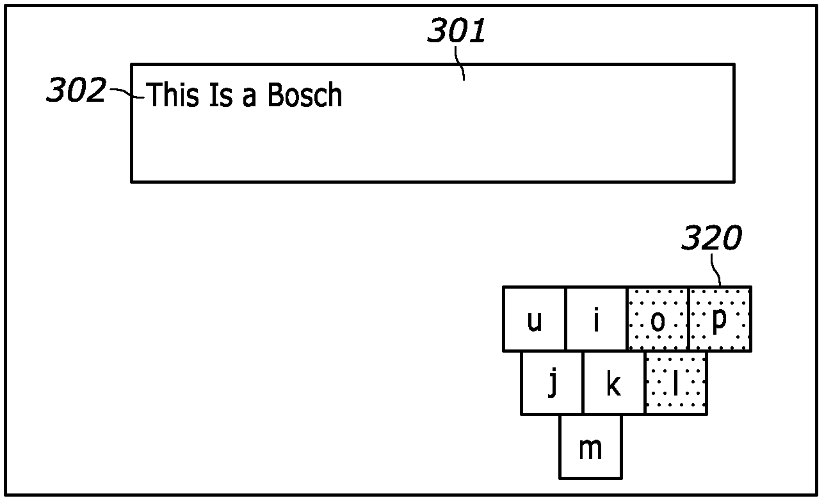
FIG. 3B illustrates a selection of a second subset with a fine area selection.

FIG. 3B discloses an example of an interface in response to the user input. For example, if the user then tilts their head towards the right, it can perform a fine selection. As shown, the letter "o" "p" and "l" may be highlighted for selection. In the inverse, the letters "u" "i" "j" "k" and "m" may be toned down. In another example, a user may first gaze at the middle coarse area. The user may then tilts the head towards right to perform the fine selection, as shown. In one embodiment, if the HMD does not have eye tracking, the coarse and fine selections may be done solely by a mobile device. Taking a joystick as an example, a user may first click the middle of the keyboard to select the middle coarse area, and then the user may push to the right to perform the fine selection.

The final selection of the "fine" selection may be a group of three or two characters, but can be any amount of characters (e.g., four characters or five characters). In one example, the "coarse" selection may mean a selection among three regions (e.g., left, middle, and right regions). Next, once a region of the coarse selection is selected, the "fine" selection may go ahead to select a row in the selected region. There may be three rows in each region. For example, "e,d,c" is the right row of the left region. Note that in right region, the three rows may be "u,j,m", "I,k", and "o,l,p", respectively.

The system will accordingly list possible words in the word list section on the screen (the possible words may be selected based on the language model). In most cases, the user may see the suggested/predicted word e.g., the word he/she intends to input) in the word list, and select it. For example, if the user wants to input "we", the user may only need to select the row "w,s,x" and "e,d,c", and the interface may output the word "we" in the suggestion section to be selected. Thus, the system may predict a word based on a selection of a group of characters (e.g., not a single character). This may include a group of two or three characters, for example.

In another example, in a situation that the user cannot find the wanted word in the word list, the user can switch to the three-step input method, which uses an additional step after step 2 above to select one character, i.e., explicitly tells system which character to choose in a row.

Figure 4:
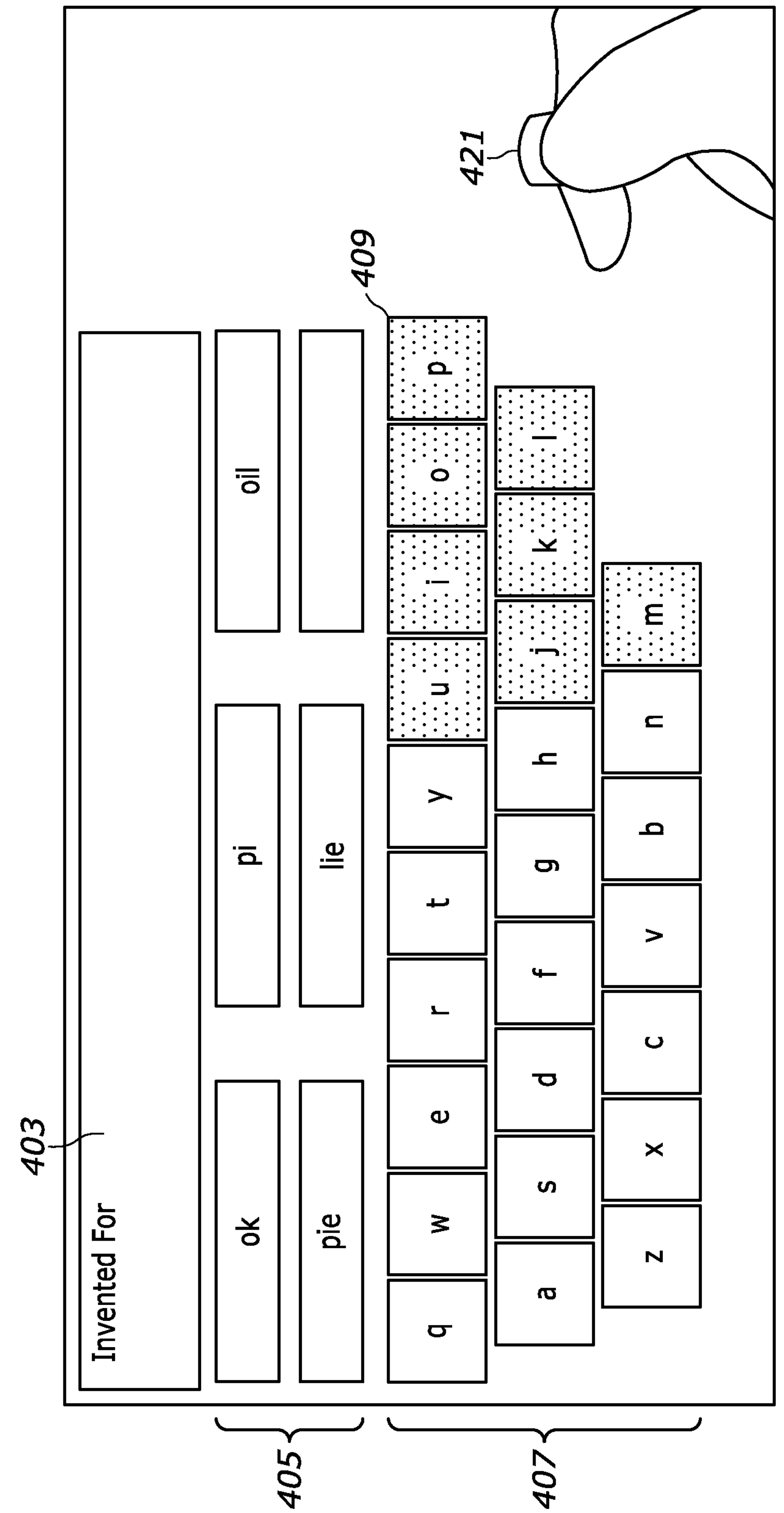
FIG. 4 illustrates an example of a virtual interface in use.

FIG. 4 illustrates an example of a virtual interface in use. The virtual interface may include a text field 403. Users can also select through multiple devices. For example, a user first gazes at the middle coarse area, then she swipes right to perform the fine selection (FIG. 3). The fine selection 409 may include a limited subset of characters of the keyboard, such as 8 characters as shown in FIG. 4. Furthermore, the interface may include a word suggestion field 405. As discussed further below, the word suggestions 405 (e.g., "OK", "pie", "pi", "lie", "oil") may be based off the previous input in the text field, such as "invented for" in the figure below.

The input interface may include mobile devices include but are not limited to controllers, joysticks, buttons, rings, eye-tracking sensors, motion sensors, physiological sensors, neuro sensors, and trackpads. Table 1 is the combination of multi-device interaction. Hand gesture and head gesture can also be used in Coarse-n-Fine keyboard. Table 1 is shown below:

| Type | Coarse selection | Fine selection |
|---|---|---|
| Single device | Eye tracking on HMD | IMU on HMD |
| Multi-device | Eye tracking on HMD | IMU on Mobile device |
| Multi-device | Eye tracking on HMD | Signal on mobile device |
| Single device | Signal on mobile device | Signal on mobile device |
| No device | Eye tracking on HMD | Hand gesture/head gesture |

While Table 1 is one example, any modality may be utilized for a first coarse selection and any modality may be utilized for any fine selection. For example, a remote control device may be utilized for the coarse selection and the fine selection. Furthermore, the same or different modalities may be utilized for either selection or for both selections.

Figure 5:
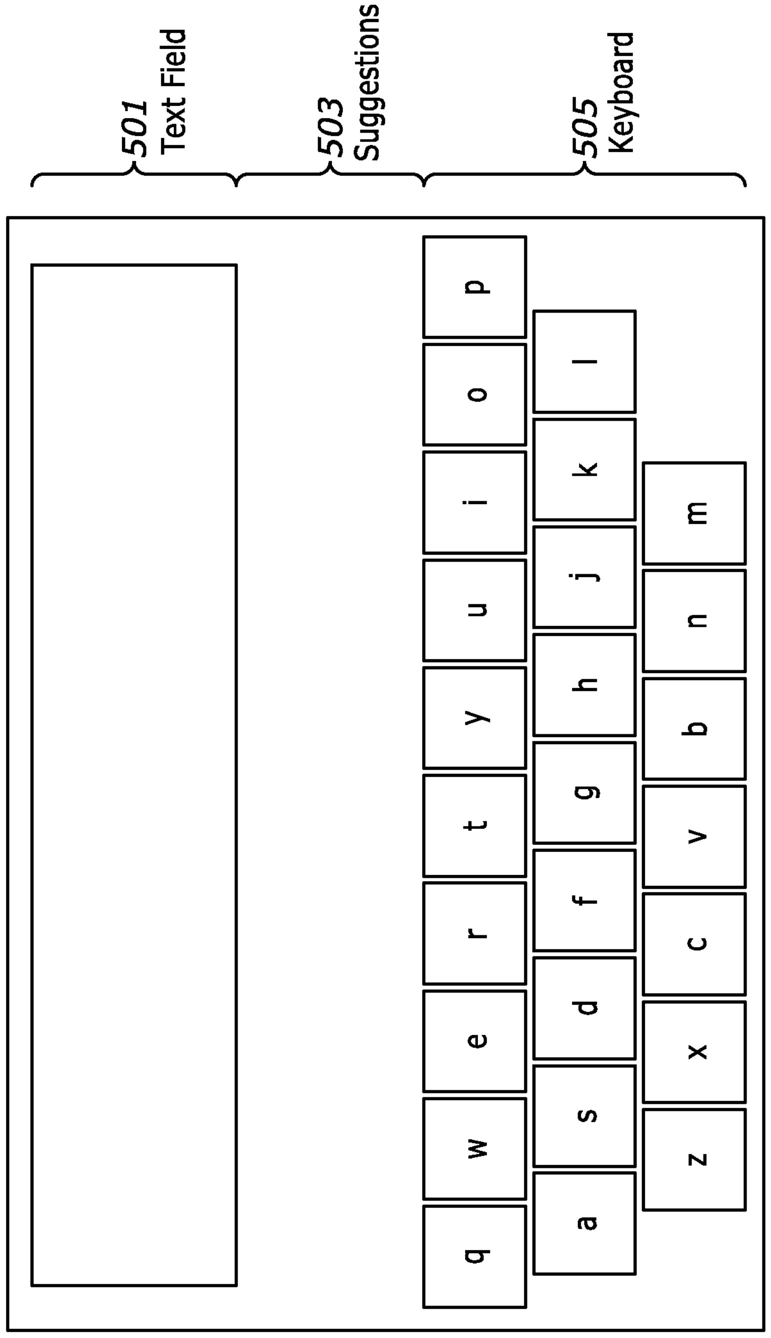
FIG. 5 discloses an interface for word suggestions.

FIG. 5 discloses an embodiment of a user interface for word suggestions. The interface may include a text field 501, suggestion field 503, and keyboard interface 505. The word that the user is attempting to enter may be ambiguous because each fine group contains multiple letters. A user may need to perform word level selection. The system may propose a word suggestion component on the typing interface. The system may put the word suggestion component in between the text entry field and the keyboard. The system may also divide the same three coarse sections that can be triggered by the same coarse selection interaction methods while typing. A second fine selection may also used, but instead of left-middle-right, fine selections, word selection may be done by up-down fine selections to differentiate word selection from character 3-gram selections. Of course, any number of fine selections may be used.

Figure 6:
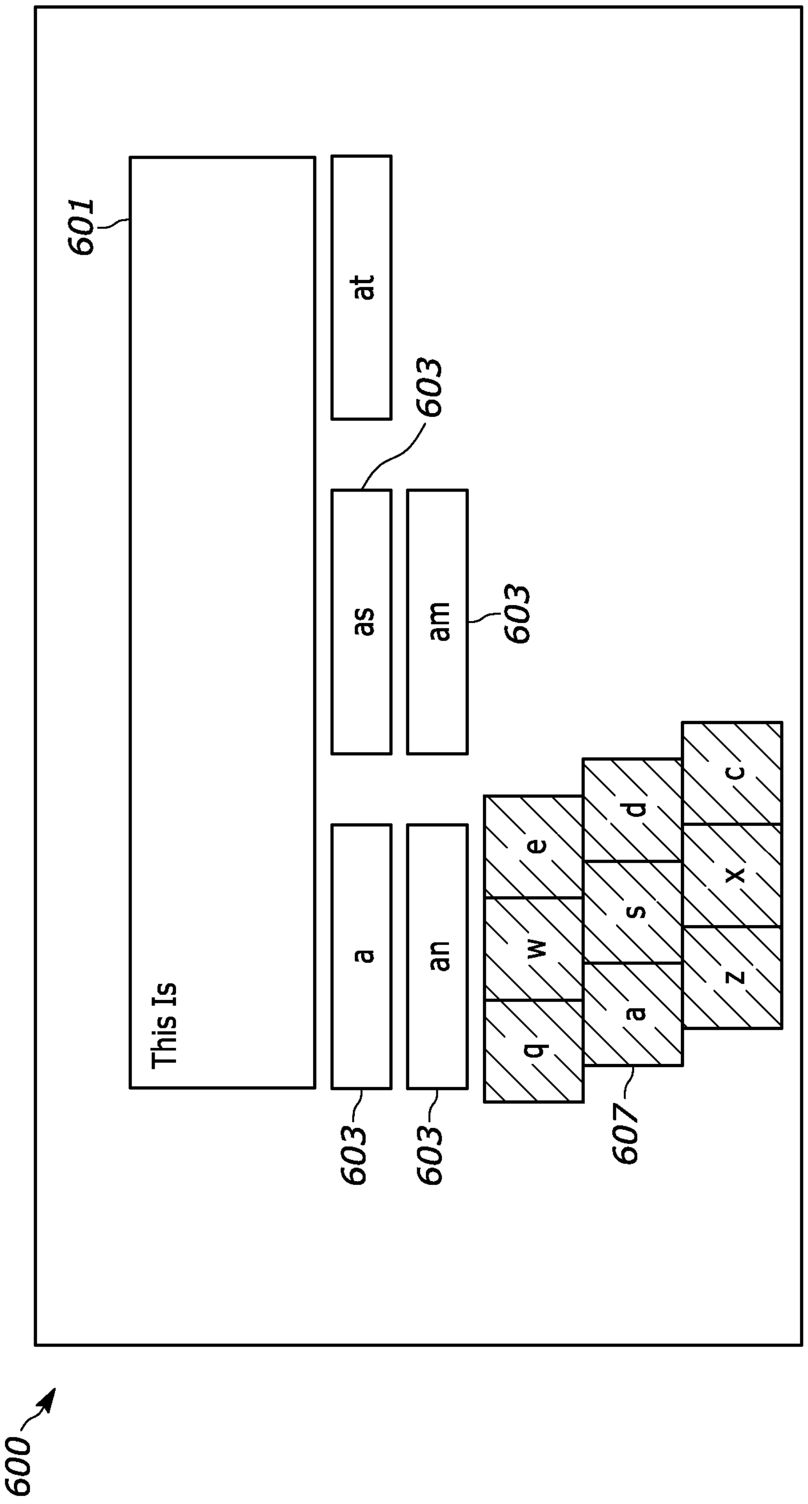
FIG. 6 illustrates an embodiment of a word suggestion on an interface.

FIG. 6 illustrates an embodiment of a word suggestion on an interface. Such an example may include a variety of methods that can be employed to offer word suggestions. The system may include a virtual interface 600. The interface may include a text field 601 where letters and words are presented before being utilized as input/output. In one example, we may suggest predicted words 603 based on the previous input. The system may utilize a language model (LM) that is a model that estimates the probability distribution over words given text context. For example, after the user inputs one or more words, a language model can be used to estimate the probability of a word occurring as the next word.

One of the simplest LM may be the n-gram model. An n-gram is a sequence of n words. For example, a bigram may be a two-word sequence of words like "please turn", "turn your", or "your homework", and a trigram maybe a three-word sequence of words like "please turn your", or "turn your homework". After trained on text corpora (or a similar model), an n-gram model can predict the probability of the next word given the previous n−1 words. More advanced language models, such as pre-trained neural-network based models, may be applied to generate better probability estimation of the next word based on longer word history (e.g., based on all the previous words).

In one disclosure, leveraging certain language models, the system can predict the next word given the existing input and the characters. As FIG. 6 shows, after a user typed "is" and selected the left area/region 607, the system may suggest a list of words "a", "as", "at" because they are likely to be the next word. Thus, simply selecting a word may reduce the steps of typing out a word. The system may also be able to provide a suggestion based on contextual information, such as time of the day, address book, emails, text messages, chat history, browser history, etc. For example, if a user wants to reply to a message and type "I'm in meeting room 303." The device may detect the user's location and prompt "303: after the user types "meeting room."

Figure 7A:
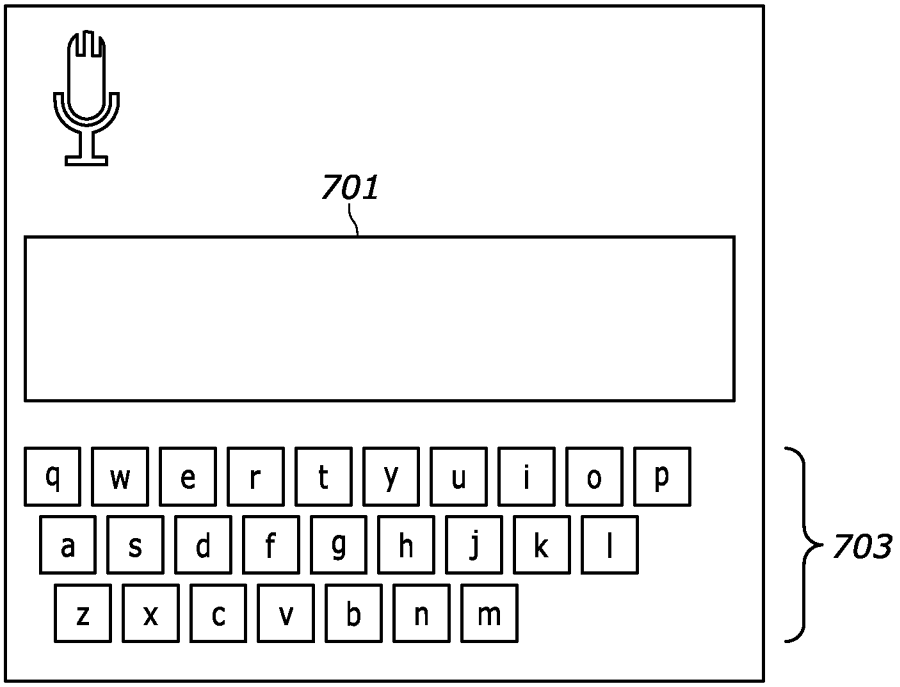
FIG. 7A illustrates an embodiment of a user interface showing a microphone icon and virtual keyboard with an empty text field.

FIG. 7A discloses an embodiment of a user interface showing a microphone icon and virtual keyboard with an empty text field. For each of the three steps, multiple methods may be provided for a user to choose. In the first step, any method (e.g., virtual-keyboard based text inputting, speech based inputting, finger/hand motion based inputting) that allows the user to input text sentences and display the inputted sentence on the virtual/augmented reality device can be included into the system as one supported sentence-input method for user to choose. In such an implementation, a virtual-keyboard based input method and a speech based input method may be provided. The virtual-keyboard based input method can be implemented in various ways. In such an embodiment, the system may utilize a "Coarse" and "Fine" virtual keyboard for text inputting. For the speech based input method, the user can input the text sentence(s) by simply saying the sentence(s). The speech signal may be collected by the microphone associated with the virtual/augmented reality device, and then processed by an on-premises or cloud-based Automatic Speech Recognition (ASR) engine. The recognized text sentence(s) (e.g., ASR result) will then be displayed (shown to the user) on the display interface of the virtual/augmented reality device. The user may choose the virtual-keyboard based input method or the speech based input method through various ways. In one implementation, we display a microphone icon above the virtual keyboard on the display of the virtual/augmented reality device, as shown in FIG. 1, and the method selection can be done by eye gaze. The user can select the speech based input method by looking at the microphone icon, or select the virtual-keyboard based input method by looking at the virtual keyboard region displayed. In other implementations, gesture, button selection, etc., can also be used to select among the two methods.

FIG. 7A may include a text field 701 that shows given text that is input by either the keyboard 703 or another modality, such as a microphone/speech input. The system may display a microphone icon and virtual keyboard for a user to choose either the speech based on a virtual-keyboard input method or by eye gaze. For example, the text field may receive characters or sentences from input utilizing a keyboard 703 that can be controlled through a multitude of input interfaces, such as a touch screen, mobile device, eye gaze, virtual keyboard, controller/joystick. In another embodiment, the text field 701 may receive input utilizing voice recognition input from a microphone and utilizing a VR engine.

Figure 7B:
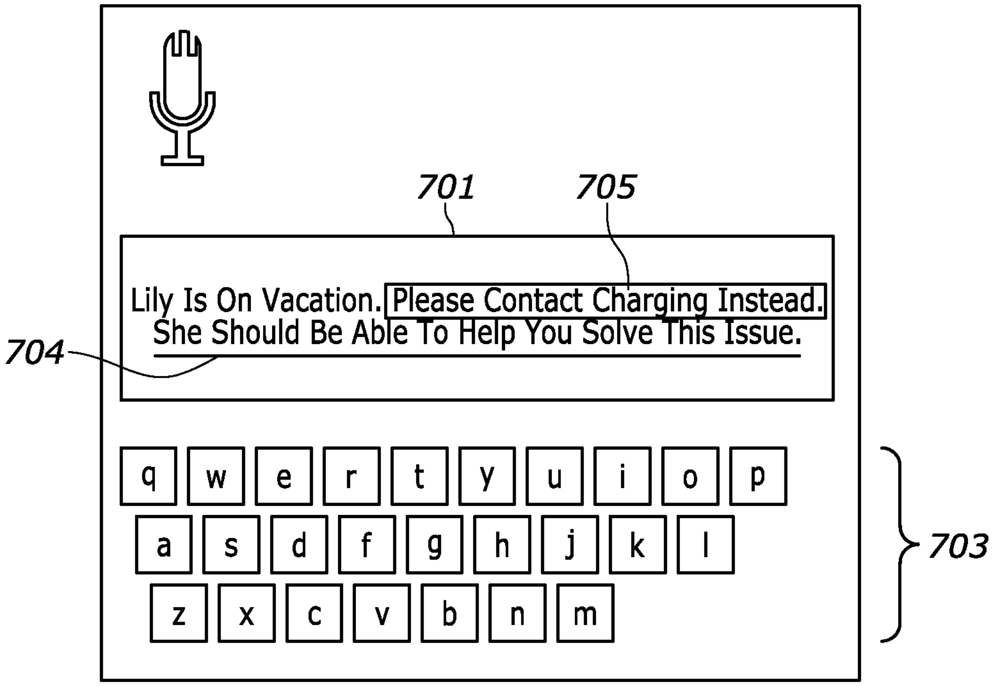
FIG. 7B illustrates an embodiment of a user interface showing a microphone icon and virtual keyboard with an input sentence.

FIG. 7B discloses an embodiment of a user interface showing a microphone icon and virtual keyboard with an input sentence. The interface may include a text field 701 that shows given text that is input by either the keyboard 703 or another modality, such as a microphone/speech input. However, the system may include text or characters 704 in the text field 701, as opposed to being empty in FIG. 7A. Thus, a next step may be for the user to input the text 704 via a first modality, which may include any type of interface (e.g., speech, voice, virtual keyboard, joystick, eye gaze, etc.). In the second step, the inputted sentence(s) 704 shown on the display of the virtual/augmented reality device, the user may select a word to edit (e.g., edit word 705) by multiple possible ways or modalities, and the selected word 705 may be highlighted on the display for further processing later. In one implementation, the user may utilize an eye gaze to capture which sentence or word the user may be interested in editing. If the user looks at one sentence for a time period longer than a threshold time period (e.g., threshold A), the system may switch to the editing mode. The threshold time may be any time period, e.g., one second, two seconds, three second, etc.). The sentence that the user is looking at will be emphasized with a block (as shown in FIG. 7B), and the word in the middle of the sentence will be automatically highlighted 705. The user can then use the left/right gesture or press the left/right button on a hand-held device (e.g., controller/joystick) or a virtual input interface to switch the highlighted region to the word on the left/right in the focused sentence. The user may continuously move the highlighted region left/right until the target word to edit is highlighted.

When a word is highlighted longer than a threshold time (e.g. threshold time B), the word may be viewed as the selected word to edit. Thus, the system may allow for a further step to edit that word (e.g., either selecting a suggested or manually inputting the words) and allow for another step that allows for such editing. In one example, once the editing is done for that word, the edited word may remain highlighted, and the user may use left/right gesture/button to move to the next word to edit. If no gesture or button pressing is detected for a time period longer than a third threshold or time-out (e.g. time threshold C), the editing task is considered completed. In another implementation, the system may directly utilize eye gazing of the user to select/highlight each word to edit by simply looking at the word for a time period longer than a fourth threshold (e.g. threshold D).

Figure 7C:
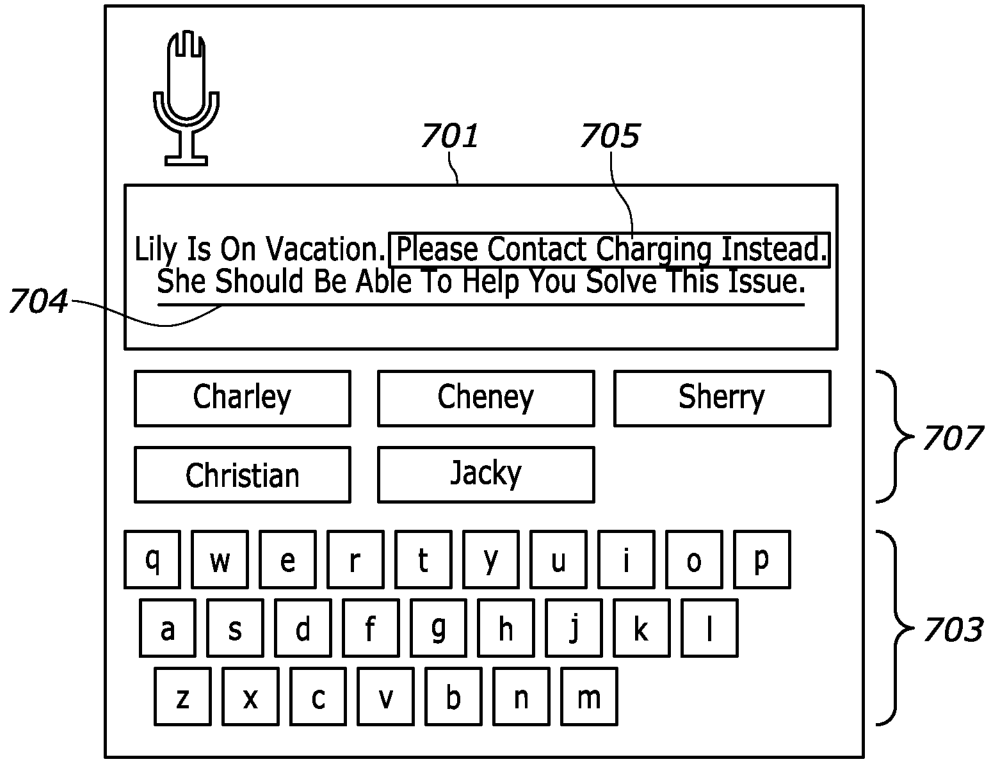
FIG. 7C illustrates an embodiment of a user interface showing suggested words and potential editing of a sentence utilizing the suggested words.
Figure 7D:
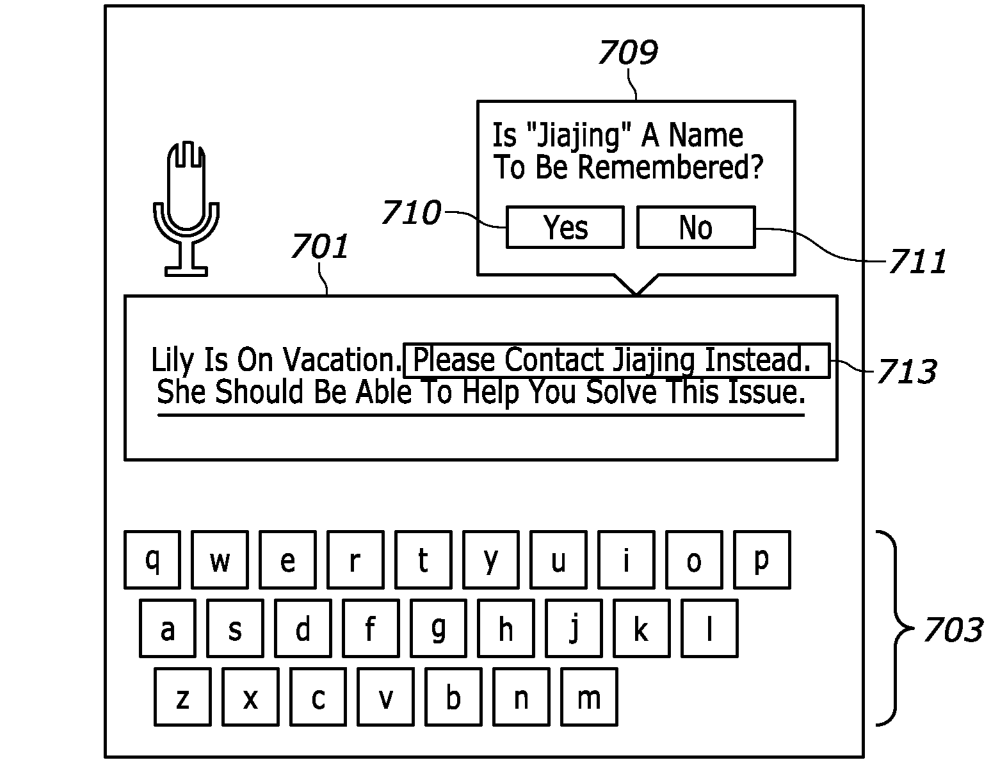
FIG. 7D illustrates an embodiment of a user interface including a pop-up interface.

FIG. 7C discloses an embodiment of a user interface showing suggested words and editing of a sentence utilizing the suggested words. During individual word editing, the system may proceed to enable the editing functions for a user to use. Once a word to edit (e.g., the highlighted word) is determined, the system (optionally) may first generate a list of alternative high-probability words, which are calculated/ranked with the aid of certain language model (e.g., n-gram language model, BERT, GPT2, etc.) based on the sentence context as well as other available knowledge (e.g., speech features if the sentence is input by speech), and this list is shown in a region of the display of the virtual/augmented reality device, as shown in FIG. 7D. If the user sees the desired word in the list of alternatives, he/she may directly select this word as the editing result for the word to edit. The selection of the desired word in the list can be done in multiple possible ways. In one example, once the user looks at the region of the list of alternative words, the first word in the list (e.g., the one with the highest probability based on the sentence context) may be highlighted. The user can then use either a gesture or button to move the highlighting to the desired word in a similar manner as described above and with respect to FIG. 7B. If a word in the list of alternatives is highlighted for a time period longer than a threshold time (e.g., threshold time E), the highlighted word will be viewed as the editing result and selected. Thus, this may be selected for the threshold time period by any modal (e.g., eye gazing, joy-stick, etc.). The system may then update the text sentence with the editing result accordingly, and the correction/editing of the focused word may be considered done. Note that during this procedure, whenever the user moves his/her eye gaze outside of the region of the list of alternatives, the highlight maybe be hidden and may be reactivated later once the users looks back to this region.

FIG. 7D discloses an embodiment of a user interface including a pop-up interface. The pop-up window 709 may include an option that asks to remember the corrected/suggested word. The user may accept the option via first interface 710 or decline the option via second interface 711. Thus, as shown in FIG. 7C, the system may add the word “Jiajing” if the user selects the “YES” 710 option. If the user selects “NO” 711 option, then it will not remember it. The system may then coordinate the added word (e.g., “Jiajing” 713) with the associated sound from the microphone input of the user. Thus, the interactive pop-up window may be used in the additional learning mechanisms. The window may be shown when the editing of a target word is done, and the user may collect the user’s feedback to facilitate the learning form the user’s edits for continuous system improvements.

In such an example, if the list of alternatives or suggested words is not provided in certain system implementation, the proposed solution proceeds to another step that allows for manual entry, and thus to provide multiple methods to user to choose in order to input one or more words as the editing result. Any method (e.g., virtual-keyboard based text inputting, speech based inputting, finger/hand motion based inputting) that allows the user to input text word(s) and replace the target word (e.g. highlighted word) to edit with the inputted word(s) can be included into the system as one supported input method for user to choose. In one example, similar to the design shown in FIG. 7A, the system may support both the Coarse-n-Fine virtual keyboard based inputting method and the speech based input method the steps of FIG. 7C to let user input new word(s) to replace the target word to edit in the text sentence. Although in this example, as the system already enters the editing mode (e.g., the word to edit is already highlighted), the user may not need to look at the microphone icon to select the speech based input method. The system may automatically select the speech mode if (1) user's speech is detected from the microphone and (2) user is not conducting the virtual keyboard based inputting. The user can choose the virtual keyboard based input method by looking at the virtual keyboard region shown on the display of virtual/augmented reality device and use the virtual keyboard to input word(s). Thus, if alternatives or suggested words are provided but the list does not include the word that the user wants, the user may proceed to use whatever modality to edit the selected word. Thus in one embodiment, after the user selects a word to edit, the system will generate a list of alternative words for the user to choose in most cases (if not always). The user may or may not see the desired word in the list of suggested words. If that desired word is in the list, the user nay directly select that suggested word. Otherwise, if the list does not include the desired word, the user uses a preferred modality (virtual keyboard, speech, any modality, etc.) to input the desired word for editing.

The disclosure also allows for an alternative embodiment to support additional learning mechanism for selecting a suggested word. In such an embodiment, the learning mechanism may attempt to avoid the repetitive happening of a same system mistake (e.g., the ASR engine mistakenly recognizes one name into another for speech based text-inputting), with user's assistance through additional HMI (i.e., human-machine interaction) design. Such learning mechanism can be implemented with various machine learning algorithms. In such an embodiment, the system may utilize a learning strategy based on the type of each edited word, (1) with available environmental knowledge (e.g., contact names in the user's address book, emails, text messages, chat history, and/or browser history, time of day, day of the week, month, etc.) considered and (2) collecting user's confirmation from an additional HMI design when necessary. When the editing is completed for an input sentence, the system may first adopt a Named Entity Recognizer (NER) to detect the different types of names in the edited region of the sentence. For example, in the input sentence "send charging a message" (as shown in FIG. 7C) obtained by speech recognition (e.g., by the speech based inputting method), the user edited the speech recognition error "charging" into the correct name "Jiajing", and the NER may then identify "Jiajing" as a person name. Note the NER can be designed/trained to detect general names (e.g., person names, city names) and/or task-specific names (e.g., machine code) that are essential to the target application. Then, once a name is detected, the system may check whether the detected name is aligned with the environmental knowledge (e.g., whether a person name is included in the user's contact list). If this is true, the system may determine that such a name is important. Otherwise, the system may pop up a small interaction window (as shown in FIG. 7C) to ask the user whether such a name should be remembered. If the user answers yes, the name also will be deemed as important. Finally, for each name deemed as important (e.g., "Jiajing"), with the aid of its detected name type (e.g., person name), the system may proceed to update relevant models in the system (e.g., the language models involved in various input methods) to boost the chance that the name can be correctly inputted in the first step (e.g., inputting a text sentence) in future (e.g., boost the chance that "Jiajing" can be directly recognized by the speech based input method). The models to update can be stored on-premises or remotely in cloud or in a hybrid fashion, while the updating method can either directly modify model parameters (e.g., assigning "Jiajing" the same probabilities as "Jessica" in an n-gram language model) or modify the model output with a post-processing procedure (e.g., directly change "charging" to "jiajing" given appropriate context).

With all the given choices of input modalities in each step, the user may be allowed the freedom to choose a desired method for each step according to the usage scenario, making the maximization of system usability and text-inputting efficiency possible. Each modality (e.g., input interface) has its own advantage and disadvantages. For example, a speech-based input method is in general efficient, while it may not be able to work in highly noisy environment, it may fail to recognize unusual names/terms, and may not be suitable to input confidential message in public space. In the meanwhile, the virtual-keyboard based input method may be relatively less efficient, but it can handle the input of confidential messages as well as the input of unusual names and terms very well. With the freedom to choose various input modality, the user can thus choose the appropriate/suitable input/edit method based on the needs in each step in real application scenario. For instance, when privacy is not a concern and environment noises are low, the user may choose to use a speech input (e.g., microphone to input sentence by speech). In case that a speech recognition error (e.g., failing to recognize an unusual name like "Jiajing") happens, the user may edit the erroneous word by typing the correct word with the virtual keyboard, or any other input modality. In another instance, when privacy is a concern, the user may choose to use the virtual keyboard to input a sentence. In case that the user wants to correct or change a word in the inputted sentence, the user may edit the word by simply saying the desired word, especially if that word is not privacy sensitive. Note that the environment scenario may change from time to time through the use of a virtual/augment reality device. The disclosure below enables the user to always choose a suitable combination of input and editing methods to fit the user's needs and maximize the text-inputting efficiency under the specific usage circumstances.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A virtual reality device, comprising:

a display configured to output information related to a user interface of the virtual reality device;

a microphone configured to receive one or more spoken word commands from a user upon activation of a voice recognition session;

an eye gaze sensor including a camera, wherein the eye gaze sensor is configured to track eye movement of the user;

a processor in communication with the display and the microphone, wherein the processor is programmed to:

in response to a first input from an input interface of the user interface, output one or more words of a text field of the user interface, wherein the input interface includes at least the microphone and the eye gaze sensor and the one or more words of the text field of the user interface are associated with the one or more spoken word commands;

in response to an eye gaze of the user exceeding a threshold time, emphasizing a group of one or more words of the text field associated with the eye gaze;

toggle through a plurality of words of only the group utilizing the input interface;

in response to a second input from the user interface associated with the toggling, highlighting and editing an edited word from the group; and in response to utilizing contextual information associated with the group of one or more words and a language model, outputting one or more suggested words associated with the edited word from the group, wherein the one or more suggested words are generating utilizing both a language model and the contextual information that includes at least a contact list; and output a pop-up window including options associated with the one or more suggested words, wherein a first option saves the one or more rested words at the language model, wherein a second option ignores one or more suggested words at the language model, and wherein a third option allows manual input of one or more suggested words to the language model and update the language model.

2. The virtual reality device of claim 1, wherein the editing includes selecting one or more suggested words.

3. The virtual reality device of claim 1, wherein the first input and the second input are not a same input interface.

4. The virtual reality device of claim 1, wherein the second input is a highlight that exceeds a second threshold time associated with the one or more words.

5. The virtual reality device of claim 1, wherein the first input is speech recognition input and the second input is a manual controller input.

6. The multimedia system of claim 1, wherein the toggling is accomplished utilizing eye gazing.

7. The virtual reality device of claim 1, wherein the processor is further programmed to output a virtual keyboard is output on the user interface, wherein the virtual keyboard includes a first section, a second section, and a third section associated with a coarse selection, wherein the first section, the second section, and third section, and wherein the contents of the first section, second section, and third section include a plurality of letters associated with the virtual keyboard, wherein in response to selecting either the first, second, or third section in the coarse selection to generate a selected section, the plurality of letters associated with the selected section are available, but not the plurality of letters for an un-selected section.

8. A system including a user interface, comprising:

a processor in communication with a display and an input interface including a plurality of modalities of input, the processor programmed to:

in response to a first input from the input interface, output one or more words of a text field of the user interface, wherein the first input is obtained from one of the plurality of modalities of input and the one or more words of the text field of the user interface are associated with one or more spoken words received at the first input;

in response to a selection exceeding a threshold time, emphasizing a group of one or more words of the text field associated with the selection;

toggle through a plurality of words of the group utilizing the input interface;

in response to a second input from the user interface associated with the toggling, highlighting and editing an edited word from the group;

in response to utilizing contextual information associated with the group of one or more words and a language model, outputting one or more suggested words associated with the edited word from the group;

in response to a third input, selecting and outputting one of the one or more suggested words to replace the edited word, wherein the first input, the second input, and the third input are obtained from different ones of the plurality of modalities of input; and output a pop-up window including options associated with the one or more suggested words, wherein a first option saves the one or more suggested words at the language model, wherein a second option ignores one or more suggested words at the language model, and wherein a third option allows manual input of one or more suggested words to the language model and update the language model.

9. The system of claim 8, wherein the selection includes an eye gaze.

10. The system of claim 8, wherein the processor is further programmed to output a pop-window indicating an option to add the suggested word to the language model.

11. The system of claim 8, wherein the processor is further programmed to, utilizing the input interface, allow for a manual entry of a manually suggested word to replace the edited word.

12. A system including a user interface, comprising:

a processor in communication with a display and an input interface including a plurality of modalities of input, the processor programmed to output:

a text field section;

a suggestion field section, wherein the suggestion field section is configured to display suggested words in response to contextual information associated with the user interface;

in response to a first input from an input interface, output one or more words at the text field section of the user interface, and the one or more words of the text field of the user interface are associated with one or more spoken words received at the first input;

in response to a selection exceeding a threshold time, emphasize a group of one or more words of the text field associated with the selection;

toggle through a plurality of words of the group utilizing the input interface;

in response to a second input from the user interface associated with the toggling, highlight and edit an edited word from the group;

in response to utilizing contextual information associated with the group of one or more words and a language model, output one or more suggested words at the suggestion field section, wherein the one or more suggested words are associated with the edited word from the group; and in response to a third input, select and output one of the one or more suggested words to replace the edited word, wherein the one or more suggested words are generated utilizing both a language model and the contextual information that includes at least an address book; and output a pop-window indicating a first option to add a manually suggested word to the language model, and wherein the pop-up window includes a second option to decline utilizing the one or more suggested words to the language model.

13. The system of claim 12, wherein the input interface includes a plurality of modalities of input.

14. The system of claim 12, the second input is a highlight that exceeds a second threshold time associated with the one or more words.

15. The system of claim 12, wherein the first input is a voice input and the second input is an eye gaze.

16. The system of claim 12, wherein the interface is programmed to, utilizing the input interface, allow for a manual entry of a manually suggested word to replace the edited word.

17. The system of claim 12, wherein toggling through the plurality of words of the group utilizes eye gazing.

* * * * *